US006097818A

United States Patent [19]

Saito

[11] Patent Number: 6,097,818

[45] **Date of Patent: *Aug. 1, 2000**

[54] DATA COPYRIGHT MANAGEMENT METHOD

[75] Inventor: Makoto Saito, Tokyo, Japan

[73] Assignee: Mitsubishi Corporation, Tokyo, Japan

[ * ] Notice: This patent is subject to a terminal disclaimer.

[21] Appl. No.: 08/888,074

[22] Filed: Jul. 3, 1997

Related U.S. Application Data

[63] Continuation of application No. 08/549,271, Oct. 27, 1995, Pat. No. 5,646,999.

[51] Int. Cl.[7] .............................. H04L 9/00; H04K 1/00

[52] U.S. Cl. ......................... 380/278; 713/170; 713/171; 713/176; 713/181; 713/193

[58] Field of Search ............................ 380/3, 4, 21, 23, 380/25, 49, 50, 278; 713/170, 171, 193, 176, 181

[56] References Cited

U.S. PATENT DOCUMENTS

| | | | |
|---|---|---|---|
| 5,291,598 | 3/1994 | Grundy . | |
| 5,319,705 | 6/1994 | Halter et al. | 480/4 |
| 5,465,299 | 11/1995 | Matsumoto et al. | 380/23 |
| 5,509,074 | 4/1996 | Choudhury et al. | 380/23 |
| 5,646,999 | 7/1997 | Saito | 380/25 |
| 5,835,601 | 11/1998 | Shimbo et al. | 713/165 |

OTHER PUBLICATIONS

Harn, L. et al: "Software Authentication System for Information Integrity" Computers & Security International Journal, Devoted to Study of Technical and Financial Aspects of Computer Security, vol. 11, No. 8, Dec. 1, 1992, pp. 747–752.

*Primary Examiner*—Pinchus M. Laufer
*Assistant Examiner*—Hrayr A. Sayadian
*Attorney, Agent, or Firm*—Armstrong, Westerman, Hattori, McLeland & Naughton

[57] ABSTRACT

The present invention provides a process for managing data copyright in the case when a primary user produces new data by editing a plurality of original data which have been supplied from data broadcasting, a recording medium or a database, and supplies the new data to a secondary user. A public-key and a private-key of the primary user, and a first secret-key and a second secret-key of the original data, each of which is controlled by a copyright management center, and an edit program are used. The primary user, who is supplied a plurality of original data encrypted by each first secret-key thereof, decrypts the plurality of original data by each of the secret-keys and produces new data using the edit program. The primary user re-encrypts the new data by the second secret-key of each original data, respectively. The re-encrypted data is supplied to the secondary-user, together with editing process data which includes a digital signature generated using the private-key. The secondary user presents the editing process data with the digital signature to a copyright management center. The copyright management center confirms that the digital signature is of the primary user, and then, transmits the second secret-key for the respective original data. In the present data copyright management process, it is possible that the secondary user edits again the data which has been edited, by using the second secret-key in place of the first secret-key and using a third secret-key in place of the second secret-key.

22 Claims, 4 Drawing Sheets

31 M31
32 M32
33 M33
34 M34 (WHOLE PART)
35 M35 (A PART)
36 M36 (REVISION)
36
37 M34 M35 M36 M37 M30

DATA COPYRIGHT MANAGEMENT METHOD

This is a continuation of application Ser. No. 08/549,271, filed on Oct. 27, 1995 now U.S. Pat. No. 5,646,999.

BACKGROUND OF THE INVENTION

1. Field of the Invention

The present invention relates to a system for managing copyrights for using, storing, copying, editing, or transmitting digital data, particularly in multimedia applications.

2. Background Art

As database systems store increasingly larger amount of information, database systems are becoming popular in which many computers, used to store various types of data independently, are connected via communication lines to share the data.

In such a database system, the information handled up to this point has been conventionally coded information that can be processed by a computer, and that contains a relatively small amount of information and monochrome binary data, such as facsimile information at most. It is not possible to handle data containing a relatively large amount of information, such as data for natural pictures or animation. A technique is under development for digital processing of picture signals other than binary data, handled only as analog signals in the past.

By digitizing the picture signal, it is possible to handle a picture signal, e.g., a television signal, by a computer. "Multimedia system" is an emerging technology of the future capable of simultaneously handling the data handled by computers and digitized picture data.

Because picture data contains an overwhelmingly large amount of information compared with character data and audio data, it is difficult to store or transfer or process the picture data by computer. For this reason, techniques for compressing or expanding picture data have been developed. Further, several standards for compression/expansion of picture data have been established. For example, the following standards have been established as common standards: JPEG (Joint Photographic image coding Experts Group) standards for still pictures, H.261 standards for video conferences, MPEG1 (Moving Picture image coding Experts Group 1) standards for picture accumulation, and MPEG2 standards for current television broadcasting and high definition television broadcasting. By using these new techniques, it is now possible to transmit digital picture data in real time.

For analog data, which has been widely used in the past, the control of copyrights during processing has not been an important issue because the quality of the analog data deteriorates each time the data is stored, copied, edited, or transferred. However, the quality of digital data does not deteriorate when the data is repeatedly stored, copied, edited, or transferred. Therefore, the management and control of copyrights during processing of digital data is an important issue.

Up to now, there has been no adequate method for management and control of copyrights for digital data. It has been managed and controlled merely by copyright law or by contracts. In copyright law, only compensation for digital sound or picture recording devices has been prescribed.

It is possible not only to refer to the content of a database, but also to effectively utilize the data obtained from the database by storing, copying, or editing the data, and also transferring the edited data to the database with the edited data registered as new data. Further, it is possible to transfer edited data to other persons via a communication link or by a proper recording medium.

In a conventional database system, only character data is handled. However, in multimedia systems, sound data and picture data originally generated as analog data, are digitized and used as part of the database in addition to the other data in the database such as character data.

Under such circumstances, it is an important question to determine how to control copyrights of the data in the database. However, there are no means in the prior art for copyright management and control of such actions as copying, editing, transferring, etc. of data.

The inventors of the present invention proposed in U.S. patent application Ser. No. 08/098,415 and U.S. Pat. No. 5,504,933 a system for managing the copyrights wherein the user is required to obtain a permit key from the key control center through a public telephone line, and in U.S. patent application Ser. No. 08/135,634 an apparatus for this purpose.

The inventors also proposed in U.S. patent application Ser. No. 08/416,037 a copyright management method applicable to both the primary use of a database system such as displaying (including audio output) and storing of digital data and the secondary use such as copying, editing, and transmission, including the real-time transmission of digital picture. This database copyright management method provides in the database system a program and copyright information required to control the copyright in addition to a permit key which is transmitted to the user. The copyright management program monitors and manages to prevent users from operating beyond the conditions of users' request or permission.

The inventors also proposed in U.S. patent application Ser. No. 08/536,747 a database copyright management system for specifically implementing the database copyright management method proposed in U.S. patent application Ser. No. 08/416,037 described above.

The system proposed in Japanese Patent Application 1994-237673 comprises a key management center that manages a crypt key K and a copyright management center that manages the database copyright. According to this system, all the data delivered from a database is encrypted by a first crypt key K1, and a primary user who wishes to uses data directly from the database requests from the key management center the key K corresponding to the specific usage by presenting information I1 on the user to the center. In response to the primary usage request from the primary user, the key management center transfers the information I1 on the user to the copyright management center. On receiving the information I1, the copyright management center transfers this information I1 with a copyright management program Pc to the key control center. On receiving the copyright management program Pc, the key control center transfers the first crypt key K1 and a second crypt key K2 corresponding to the specific usage together with the copyright management program Pc to the primary user via a communication network. On receiving the first crypt key K1, the primary user uses this key to decrypt the data. The user subsequently uses the second crypt key K2 to encrypt and decrypt data when storing, copying or transmitting the data.

In cryptographic systems, the use of the crypt key K to encrypt a plaintext M to obtain a cryptogram C is expressed as:

$$C=E(K, M)$$

and the use of the crypt key K to decrypt the cryptogram C to obtain the plaintext M is expressed as:

$$M=D(K, C).$$

These conventions are followed hereafter in the specification.

If data is copied to an external recording medium or transmitted without being stored, the first and second crypt keys K1 and K2 are disused. If the primary user wishes to use the data again, the first and second crypt keys K1 and K2 are re-delivered to the user from the copyright management center. The re-delivery of the second crypt key K2 indicates that the data has been copied or transferred to a secondary user, and this is recorded in the copyright management center.

In requesting a secondary usage to the copyright management center, the secondary user presents the information I1 on the primary user and information I0 on the original copyright to the copyright management center. The copyright management center transmits to the secondary user a permit key Kp corresponding to the specific usage, together with a second crypt key K2 (viewing permit key), a third crypt key K3 (a permit key corresponding to the specific usage), and the copyright management program Pc which have been encrypted.

Typical encryption techniques include secret-key cryptosystem and public-key cryptosystem. The secret-key cryptosystem uses the same crypt key Ks for both encryption and decryption:

$$CmKs=E(Ks, M)$$

$$M=D(Ks, Cmks).$$

In the public-key cryptosystem, a key for encryption is open as a public-key, while a key for decryption is not open and is called a private-key. To use this cryptosystem, an information provider encrypts using the public-key Kb for a receiver:

$$Cmkb=E(Kb, M),$$

and the receiver decrypts the encrypted data using the private-key Kv that is not open:

$$M=D(Kv, Cmkb).$$

In the U.S. patent application Ser. No. 08/536,747, filed on Sep. 29, 1995, the inventors have proposed an invention that employs a first public-key Kb1, a first private-key Kv1 corresponding to the first public-key Kb1, a second public-key Kb2, and a second private-key Kv2 corresponding to the second public-key Kb2 that are prepared by the user, and a first secret-key Ks1 and a second secret-key Ks2 prepared by the database. The database uses the first secret-key Ks1 to encrypt data M:

$$Cmks1=E(Ks1, M)$$

and further encrypts the first secret key Ks1 by the first public-key Kb1:

$$Cks1kb1=E(Kb1, Ks1)$$

and encrypts the second secret-key Ks2 by the second public-key Kb2:

$$Cks2kb2=E(Kb2, Ks2)$$

The database then transmits these encrypted data Cmks1 and the first and the second secret-keys CKs1kb1 and Cks2kb2 to the user. The user decrypts the first secret-key Cks1kb1 using the first private-key Kv1:

$$Ks1=D(Kv1, Cks1kb1),$$

and decrypts the encrypted data Cmks1 using the decrypted first secret-key Ks1:

$$M=D(Ks1, Cmks1)$$

and the encrypted second secret-key Cks2kb2 using the second private-key Kv2:

$$Ks2=D(Kv2, Cks2kb2).$$

The decrypted second secret-key Ks2 is used for storing, copying, and transferring data after data decryption.

SUMMARY OF THE INVENTION

The database copyright management system proposed in U.S. patent application Ser. No. 08/536,747 assumes that a single data or database is used in the system, and not that a plurality of data or databases are used to create new data by editing. The inventors thus propose in this application a data copyright management system assuming that a plurality of data or databases are edited to produce new data.

If a plurality of encrypted data obtained from one or more databases are edited to produce and encrypt new data and if the encrypted data is then supplied to a different user, this system employs as a use permit key, both a crypt key for each of the plurality of data that are source materials and data of an edit program used as an edition process with a digital signature.

Upon receiving edited and encrypted data, a different user requests the use of the data by presenting the data with the digital signature to the copyright management center. The copyright management center then identifies from the digital signature the person who has edited the data, and supplies a key for using the data to the user when requested only if it has confirmed that the person who has edited the data is a valid user of this data.

In another system, a primary user who desires to use original data encrypted using the first crypt key and supplied makes a request to the key control center to send primary use permit key. The key control center distributes the primary use permit key to the primary user and charges therefor.

The primary user decrypts encrypted data using the first crypt key included in the primary use permit key to use the data. When decrypted data is stored in the primary user device, it is encrypted again using the primary use permit key. The primary user who requires to edit data requests the key control center for distributing secondary use permit key for data edition. The key control center distributes the secondary use permit key to the primary user.

The primary user who receives the secondary use permit key produces the copies of primary copyrighted data, edits copied data, encrypts decrypted secondary data during edition by the second crypt key included in the secondary use permit key. Finally edited data is encrypted using the third crypt key and stored in the primary user device. The primary user registers the third crypt key into the key control center in order to execute the secondary copyright as secondary exploitation right with reference to the data edition for the secondary copyrighted data, encrypts the secondary data using the third crypt key and supplies the secondary user with such data by copying it to an external medium or by transferring it via a network system.

The secondary user who requires encrypted secondary data makes a request to the key control center for distributing the third crypt key. The key control center distributes the third crypt key to the secondary user. The secondary user who receives the third crypt key decrypts encrypted secondary data using the third crypt key to use it.

DETAILED DESCRIPTION OF THE INVENTION

The present invention is a data copyright management system described with respect to multimedia applications. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

Figure 1:
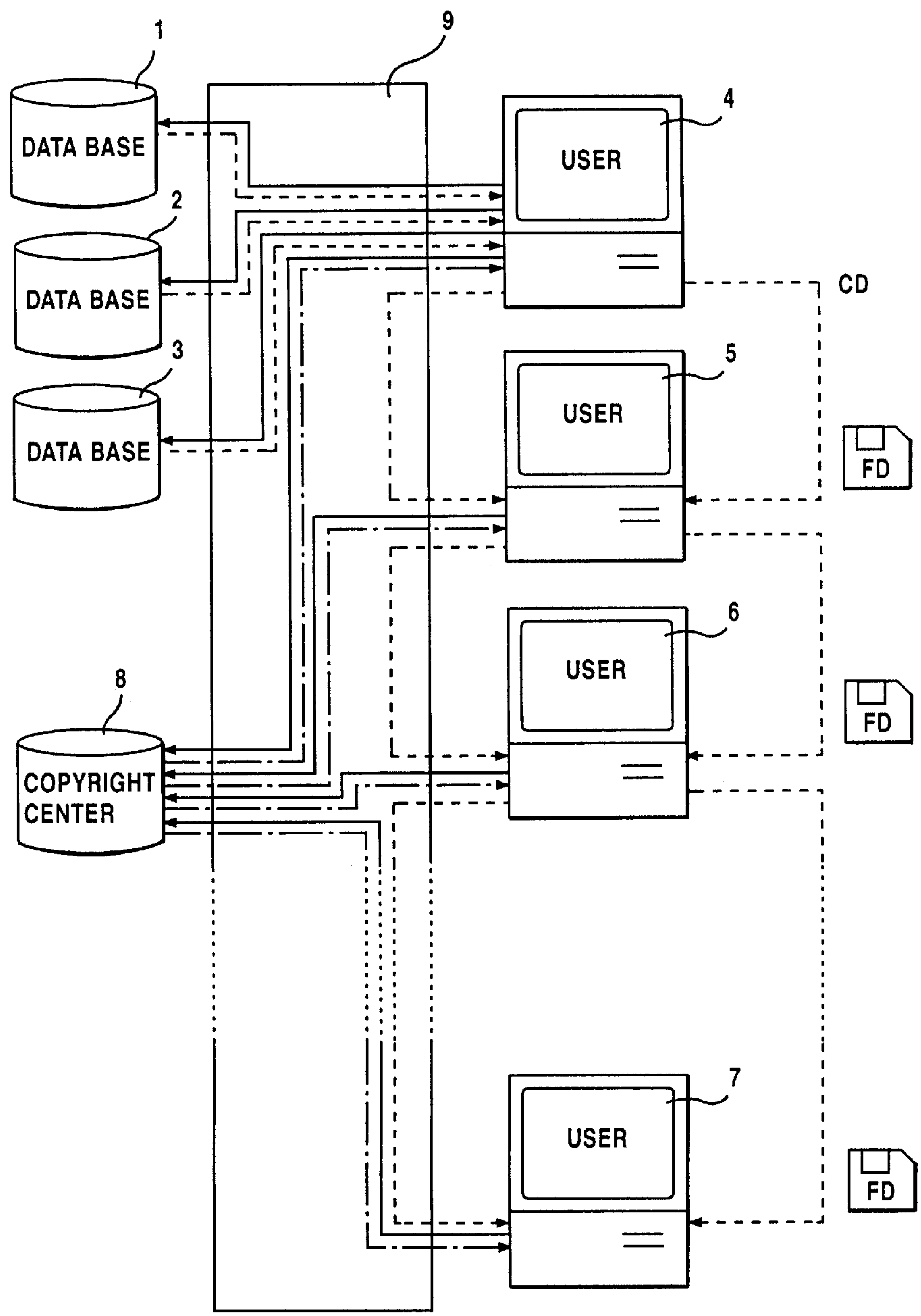
FIG. 1 is a block diagram of an embodiment of a data copyright management system according to the present invention.

FIG. 1 shows a block diagram of a data copyright management system according to this invention. The data stored in the database in this system is not encrypted. In addition to databases, the embodiment in U.S. patent application Ser. No. 08/536,747 uses satellite broadcasting or a storage medium as a means for supplying data. In the embodiment shown in FIG. 1, however, only databases are shown as a means for supplying data for the convenience of explanation. It would be appreciated, however, that this invention can be used in conjunction with satellite, terrestrial wave or CATV broadcasting that come free due to advertisement and the like and do not require encryption, or with a recording medium as well as databases as a means for supplying data.

If a primary user copies data obtained and supplies it to a secondary user, the data does not involve the copyright of the primary user because no modifications have been made to the data. If, however, the primary user produces new data based on the data obtained or using a means for combining the original data with other data, the new data involves a secondary exploitation right for the primary user. Similarly, if the secondary user produces new data based on the data obtained from the primary user or using a means for combining with other data, the new data involves a secondary copyright as secondary exploitation right for the secondary user.

In the embodiment shown in the figure, reference numerals 1, 2, and 3 represent databases that store text data or binary, audio, and/or picture data constituting computer graphics screens or programs, which is not encrypted; 9 is a communication line such as a public telephone line provided by a communication company or a CATV line provided by a cable television company; 4 is a primary user terminal; 5 is a secondary user terminal; 6 is a tertiary user terminal; and 7 is an n-th user terminal device. Reference numeral 8 represents a copyright management center for managing the data copyright.

The databases 1, 2, and 3, copyright management center 8, primary user terminal 4, secondary user terminal 5, tertiary user terminal 6, and n-th user terminal 7 are connected to communication line 9. In FIG. 1, encrypted data is transmitted via the path shown by a broken line, requests are transmitted from user terminal 4, 5, 6, or 7 to database 1, 2, or 3 and copyright management center 8 via the path shown by a solid line. The permit key, copyright management program, and crypt key corresponding to a specific usage are transmitted from database 1, 2, or 3 and copyright management center 8 to user terminal 4, 5, 6, or 7 via the path shown by an one-dot chain line.

The embodiment in FIG. 1 employs a first public-key Kb1, a first private-key Kv1 corresponding to the first public-key Kb1, a second public-key Kb2, and a second private-key Kv2 corresponding to the second public-key Kb2 that are prepared by the user, and a first secret-key Ks1 and a second secret-key Ks2 prepared by the database. The database uses the first secret-key Ks1 to encrypt data M:

$$Cmks1=E(Ks1, M)$$

and further encrypts the first secret-key Ks1 by the first public-key Kb1:

$$Cks1kb1=E(Kb1, Ks1)$$

and the second secret-key Ks2 by the second public-key Kb2:

$$Cks2kb2=E(Kb2, Ks2).$$

The database then transmits these encrypted data Cmks1 and the first and the second secret-keys Cks1kb1 and Cks2kb2 to the user.

The user decrypts the encrypted first secret-key Cks1kb1 using the first private-key Kv1:

$$Ks1=D(Kv1, CKs1kb1),$$

and decrypts the encrypted data Cmks1 by the decrypted first secret-key Ks1:

$$M=D(Ks1, Cmks1)$$

and use it. Further, the user decrypts encrypted second secret-key Cks2kb2 by the second private-key Kv2:

$$Ks2=D(Kv2, Cks2kb2),$$

which is subsequently used as a crypt key for storing, copying, or transmitting data.

If primary user 4 copies data obtained and then supplies it to secondary user 5, the data does not involve the copyright of primary user 4 because no modifications have been made to the data. If, however, primary user 4 produces new data based on the data obtained or using a means for combining the original data with other data, the new data involves a secondary exploitation right for primary user 4, and primary user 4 has the original copyright for this secondary work.

Similarly, if secondary user 5 produces new data based on the data obtained from primary user 4 or combines with other data, the new data involves a secondary exploitation right for the secondary user 5, and the secondary user 5 has the original copyright of this secondary work.

Databases 1, 2, and 3 store text data or binary, digital audio, or digital picture data constituting computer graphics screens or programs in unencypted form. This data is encrypted and supplied to user terminal 4 via communication line 8 during a data read operation in response to a request from primary user terminal 4.

The method described in Japanese Patent Application 1994-237673 or in the U.S. patent application Ser. No. 08/536,747 filed on Sep. 29, 1995, can be used to manage the copyright of data obtained from the database. These applications adopt both the secret-key and public-key cryptosystems as crypt methods.

Although the use of the public-key cryptosystem in the encryption of data improves the security of encrypted data, the encryption of data containing a large amount of information using the same system requires a significantly long time for decryption and is not practical. The amount of information contained in crypt keys, however, is not so large as that in data because such keys must be operated by human operators.

This copyright management system employs a first public-key Kb1, a first private-key Kv1 corresponding to the first public-key Kb1, a second public-key Kb2, and a second private-key Kv2 corresponding to the second public-key Kb2 that are prepared by the user, and a first and a second secret-keys Ks1, Ks2 prepared by the database.

The database uses the first secret-key Ks1 to encrypt data M:

$$Cmks1=E(Ks1, M),$$

and further encrypts the first secret-key Ks1 using the first public-key Kb1:

$$Cks1kb1=E(Kb1, Ks1)$$

and the second secret-key Ks2 using the second public-key Kb2:

$$Cks2Kb2=E(Kb2, Ks2).$$

The database then transmits these encrypted data and first and second secret-keys Cks1kb1, Cks2kb2 to the user.

The user decrypts the encrypted first secret-key Cks1kb2 using the first private-key Kv1:

$$Ks1=D(Kv1, Cks1kb1),$$

and decrypts the encrypted data Cmks1 using the decrypted first secret-key Ks1:

$$M=D(Ks1, Cmks1)$$

to use it, and decrypts the encrypted second secret-key Cks2kb2 by the second private-key Kv2 which is to be used in subsequent store, copy or transmit operations for decrypted data.

Figure 2:
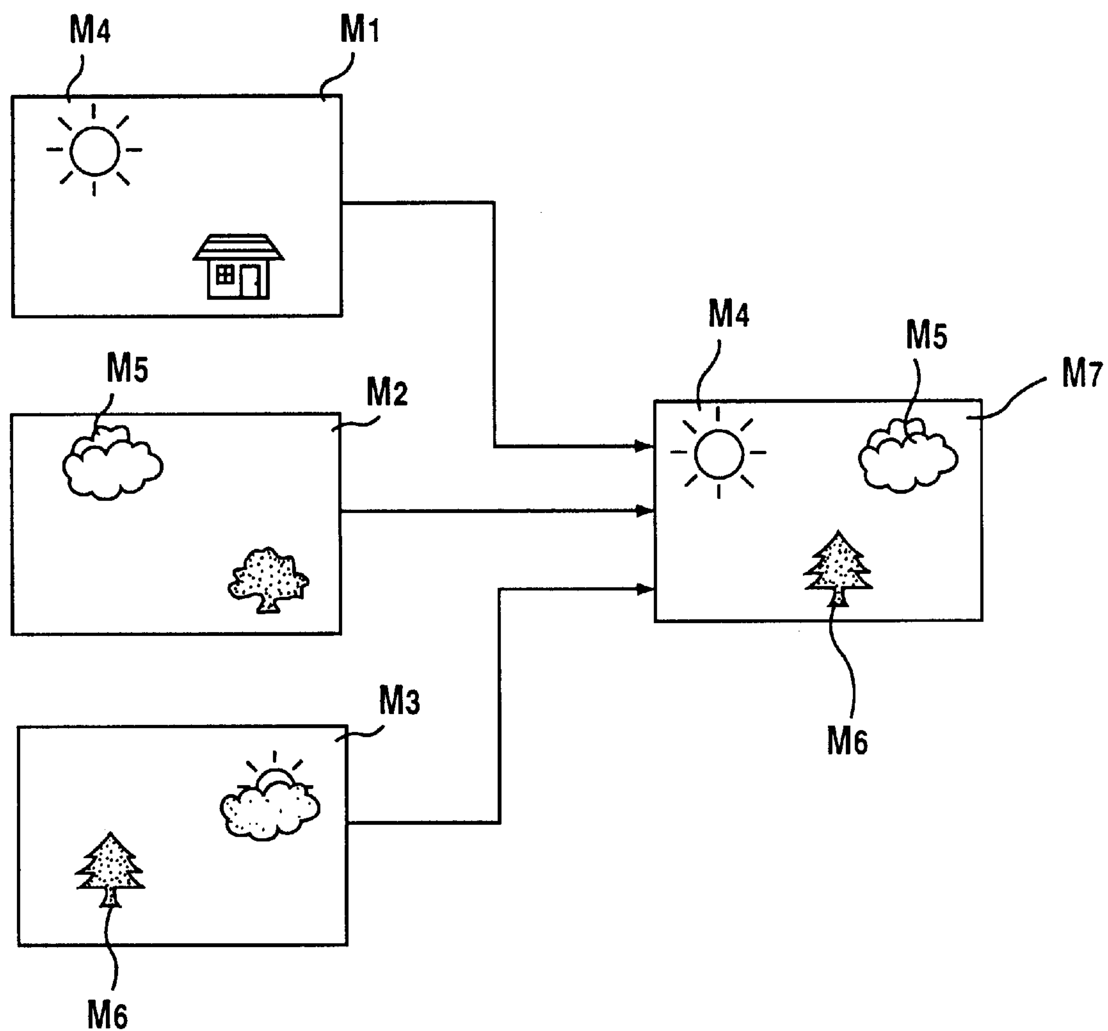
FIG. 2 illustrates an example of producing new copyrighted data using a plurality of copyrighted data as objects.

FIG. 2 describes the edit operation for a plurality of data to produce new data. As shown in the Figure, primary user 4 extracts parts M4, M5 and M6 constituting data from a plurality of data M1, M2 and M3 obtained from one or more databases, and produces new data M7 from parts M4, M5 and M6.

Primary user 4 supplies new data M7 to secondary user 5; new data M7 involves a secondary copyright associated with editing of original data M1, M2 and M3 as well as the original copyright for original data M1, M2 and M3 from which parts M4, M5 and M6 produce new data M7.

The original data M1, M2 and M3 are encrypted using each of the second secret-keys Ks21, Ks22 and Ks23 supplied with each of data M1, M2 and M3 when used for operations other than display; i.e., store, edit, copy or transmit:

$$Cm1ks21=E(Ks21, M1)$$

$$Cm2ks22=E(Ks22, M2)$$

$$Cm3ks23=E(Ks23, M3).$$

The data M4, M5 and M6, parts of original data are also encrypted using each of the second secret-keys Ks21, Ks22 and Ks23 supplied with each of the original data thereof when used for operations other than display:

$$Cm4ks21=E(Ks21, M4)$$

$$Cm5ks22=E(Ks22, M5)$$

$$Cm6ks23=E(Ks23, M6).$$

The new data comprises the original data and the process the data has been edited by.

In the computer technology, editing of data is represented by original data and an editing process for it. Furthermore, the original data and editing process can be represented by a computer program and the data written in the computer program. The program and data constitute what is referred to as "object", and the computer processing about objects is called an object-oriented technology, which has recently become most popular among the computer technologies.

The technique for producing new data from a plurality of data parts is called a frame work or scenario; the "Object Linking and Embedding" (OLE) program from Microsoft Corp. and "OpenDoc" from Apple Computer Inc. are typical examples.

This invention treats as objects the relationship between original data parts and a frame work or scenario constituting an edit process, in addition to the original data parts.

Primary user 4 who has edited the data provides a digital signature for edition program Pe using first private-key Kv1:

$$Spe=D(Kv1, Pe)$$

and supplies encrypted original data parts Cm4ks21, Cm5ks22 and Cm6ks23 to secondary user 5 together with the edition program Pe with the digital signature.

Upon receipt of the encrypted original data parts Cm4ks21, Cm5ks22 and Cm6ks23, and the edit program Pe, secondary user 5 requests second secret-key Ks21, Ks22 and Ks23 for decryption of the encrypted original data parts Cm4ks21, Cm5ks22 and Cm6ks23, by presenting the edit program Pe with the digital signature to copyright management center 8.

Data copyright management center 8 identifies primary user 4 from the presented digital signature in the edit program Pe, using first public-key Kb1:

$$Pe=E(Kb1, Spe),$$

and determines if primary user 4 is a valid user to use the original data to which the requested second secret-keys Ks21, Ks22 and Ks23 corresponds. If primary user 4 is the valid user, the center transmits the second secret-keys Ks21, Ks22 and Ks23 to secondary user 5. Otherwise, it does not transmit the second secret-keys Ks21, Ks22 and Ks23 to secondary user 5.

The digital signature Spe presented to copyright management center 8 is registered in the center as a valid procedure for authorizing secondary copyright owner.

This system may limit to appropriate n-th order usage according to decision in practice by the database or original copyright owner, not allowing indefinitely repeated usage from primary use till n-th order use, and may make data which has been used to certain-order be registered as next original data.

Figure 3:
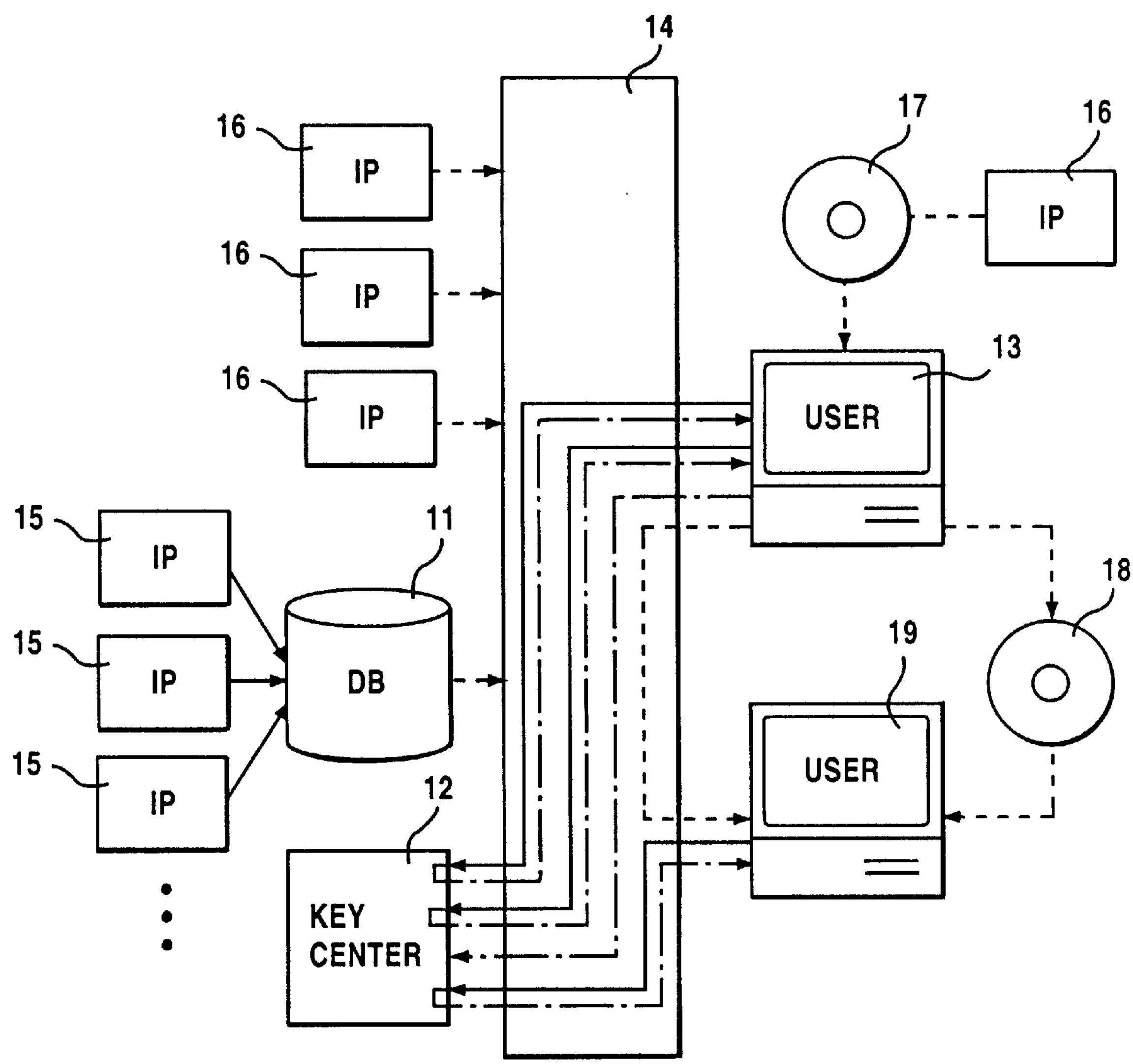
FIG. 3 is an outlined block diagram of another embodiment of data copyright management system according to the present invention.

The system of FIG. 3 uses primary use permit key K1 including first secret-key Ks1, secondary use permit key K2 including second secret-key Ks2, third secret-key Ks3, plaintext original copyright label Lc1 and plaintext copyright management program Pc.

The data copyright management system shown in FIG. 3 comprises database 11, key control center 12, users 13, 13, 13 . . . and network 14 that connects these entities. Database 11 receives data from information providers (IP) 15, 15, 15 . . . . However, in some cases, data is supplied directly to users 13 from information providers 16, 16, 16 . . . via network 14 without database 11 intervening.

The data used in the invention is the object comprising combined program and data. Data is supplied from information providers 15, 15, 15 . . . to database 11 and to primary users 13. However, in some cases, data is supplied from information providers 16, 16, 16 . . . via network 14 or via information recording medium 17 such as CD-ROM or the like directly to primary users 13 without database 11 intervening.

The solid line, broken line and one-dot chain line in FIG. 3 show the path for data and requests for crypt keys, path of encrypted data and path of encrypt keys, respectively.

Primary users 13 are not merely users but can be information providers 15 or 16 that provide new data (secondary copyright data) by combining or revising a plurality of obtained original data.

In the data copyright management system according to the present invention, the original data provided by each of information providers 15 and 16 has been encrypted to protect the copyright. Therefore, the use of the encrypted original data obtained by users 13 needs to be decrypted. All of the crypt keys for decryption are deposited in key control center 12 to be controlled by the center.

Each information provider 15 and 16 can adopt freely any cryptosystem. However, the cryptosystem described later and used after secondary utilization of data is limited to one adopted by key control center 12.

The data obtained from databases are normally used by personal computers. The operating system used for this purpose requires incorporated functions for security control. Copyright management program is used to control crypt keys. As it is necessary to store this copyright management program and the crypt keys received from key control center 12, for example, a key card which is virtually implemented as hardware in a unique board or a PC card, or as software in the memory or HDD is used for the storage area.

Regardless of whether key control center 12 is actually used or merely registered, it stores crypt key to protect the copyright of data works and to charge for using the copyright, and controls crypt key by establishing the relationship between stored crypt key and copyright labels.

In this system, plaintext original data M0 is encrypted by first secret-key Ks1:

$$Cm0ks1=E(Ks1, M0),$$

and is provided to primary users 13 from information providers 15 via database 11 and network 14, or from information providers 16 via network 14, or via information recording medium 17 such as CD-ROM, together with original copyright label Lc1.

Original plaintext copyright label Lc0 is attached to encrypted original data Cm0ks1 provided for primary users 13, and which is used for obtaining primary use permit keys, etc. Namely, encrypted original data Cm0ks1 includes plaintext original copyright label Lc0 and encrypted original data Cm0ks1. The name of application programs in use, outlined explanation, fees and charging method are entered into plaintext original copyright label Lc0 in addition to general information including the name of original creator, title name and creation date. The number of use for permit keys is also entered if necessary. Digital signature by original creator added to plaintext original copyright label Lc0 prevents false copyright claiming.

Primary users 13 who require use of encrypted original data Cm0ks1 makes a request to key control center 12 via network 14 for distributing primary use permit keys K1 indicating original copyright label Lc1.

Key control center 12 that has identified key K1 as primary use permit keys to be distributed, by original copyright label Lc1 indicated, distributes this identified key to primary users 13 via network system 14. Upon receipt of distributed primary use permit key k1, the devices of primary users 13 are turned to the copyright management mode, and primary copyrighted data becomes available for use to primary users 13. As the first secret-key Ks1 is included in primary use permit key k1, it is not recognized by primary users 13.

On the other hand, key control center 12 charges as well as grasps the use condition of copyrighted data and of the database used by primary users 13.

Primary users 13 decrypt encrypted primary copyrighted data Cm0ks1 using first secret-key Ks1 included in primary use permit key K1:

$$M0=D(Ks1, Cm0ks1),$$

and use it.

When decrypted original data M0 is stored in primary users 13 devices, it is encrypted again by first secret-key Ks1:

$$Cm0ks1=E(Ks1, M0),$$

and encrypted original data Cm0ks1 is stored.

For repeated use of encrypted original data Cm0ks1, repeated decryption and encryption are carried out using first secret-key Ks1.

Primary users 13 who desire to edit original copyright data M0 makes a request to key control center 12 for distributing secondary use permit key K2 via network 14. Key control center 12 that receives the request for distributing secondary use permit key K2 provides primary users 13 with secondary use permit key k2 via network 14. Primary users 13 that have received secondary use permit key K2 edit original data M0 and obtain halfway edited data M0'.

When halfway edited data M0' is stored in users 13 devices, it is encrypted by second secret-key Ks2:

$$Cm0'ks2=E(Ks2, M0').$$

When the edit is finally completed, primary users 13 prepare third secret-key Ks3 in order to execute the secondary copyright with reference to the data edition concerning final editorial data M1, and register third secret-key Ks3 into key control center 12. The key control center 12 also may prepare third secret-key Ks3 and distribute it in response to a request from primary users 13.

When primary users 13 copy editorial data M1 into external recording medium 18 or transfer it via network 14, they encrypt editorial data using third secret-key Ks3:

$$Cm1ks3=E(Ks3, M1),$$

and provide it to secondary users 19.

Secondary users 19 who desire to use provided encrypted editorial data Cm1ks3 makes a request to key control center 12 for distributing third secret-key Ks3 via network 14. Key control center 12 that has received the request for distributing third secret-keys Ks3 from secondary users 19 distributes third secret-key Ks3 to secondary users 19 via network 14.

Secondary users 19 who have received third secret-keys Ks3 decrypt encrypted editorial data Cm1ks3 using third secret-key Ks3:

$$M1=D(Ks3, Cm1ks3)$$

and use it.

When using encrypted data Cm1ks3 again, decryption and encryption are carried out using third secret-key Ks3 also in this case.

This section describes the restrictions applicable to the primary use carried out by copyright management program Pc.

Similar to the invention described in Japanese Patent Application 1994-64889, the usage of the data obtained and decrypted according to the data copyright management system according to the invention is limited to normal form of use, namely, direct use of data and the output including printing of usage results. Copying into external recording medium, edit and transfer via network system, and, in principle, data storage inside devices are impossible. On the other hand, the storage of encrypted data is possible.

It is possible to display, print, store, copy, edit and transfer the data of which copyright has not been claimed with reference to the application programs m use.

Encrypted original data Cm0ks1 that primary users 13 have obtained from external information providers 15 or 16 directly or via database 11 is combined with original copyright label Lc0 and stored in storage devices such as a hard disk drive or non-volatile memory inside primary users 13 terminals.

Primary users 13 who desire primary use of encrypted original data Cm0ks1 stored in memory identify the application environment of the program used by original data M0, referring to plaintext original copyright label Lc1. When original data M0 is determined to be possible for use as a result, and primary users 13 indicate intention to use this original data M0 to the copyright management program Pc, the copyright management program Pc activates application programs used by original data M0 and then, encrypted original data Cm0ks1 is read from storage into the volatile memory in the devices.

On the other hand, primary copyright label Lc1 is sent to key control center 12. When primary use permit key K1 is provided pursuant to the above processing flow, encrypted original data Cm0ks1 is decrypted using the first secret-key Ks1 included in primary use permit key K1:

$$M0=D(Ks1, Cm0ks1),$$

and it becomes available for use by means of the activated application program.

In the case original data M0 that has been decrypted in the volatile memory of primary users 13 terminals is to be stored in storage, it is encrypted using first secret-key Ks1:

$$Cm0ks1=D(Ks1, M0).$$

This store operation includes the creation and storage of temporary file for data security.

When using re-encrypted data Cm0ks1 again, repeated decryption/encryption are carried out using first secret-key Ks1.

In using primary use permit key K1, it is possible to display and print decrypted original data M0 and store encrypted original data Cm0ks1 by copyright management program Pc. However, other forms of usage such as store, edit, copy of decrypted original data M0, copy into external recording medium and transfer it to other devices, and also copying encrypted original data Cm0ks1 into external recording medium and transferring it to other devices are prohibited.

Therefore, it is prohibited to perform cut and paste a part of original data M0 to other general data D, and to cup a part of general data D and paste it to original data M0 by means of copyright management program Pc.

As an exception, it is possible to store original data M0 in storage if it is with encrypted by first secret-key Ks1. However, storage is prohibited if any edit has been performed.

Copyright control program Pc can distinguish the original data M0 from the general data D of no copyright claimed, and determine whether original data M0 has been edited or not.

The above determination is carried out by examining the look-up table in which file attribute is written, comprising computer file together with file body. In this look-up table, in addition to the file size and creation date, a flag is written to show that the copyright has been claimed. By examining these items, it is possible to determine whether the copyright has been claimed and whether the file has been edited.

Original data M0 is combined with original copyright label Lc1 as encrypted original data Cm0ks1 when it is stored in a storage device. When it is decrypted and read into volatile memory, decrypted original data M0 and original copyright label Lc1 are separated by copyright management program Pc, and the separated copyright label Lc1 is controlled by copyright management program Pc.

Copyright management program Pc monitors which application program is used for original data M0, and prohibits to cut and paste original data M0 on general data D and to cut and paste general data D on original data M0.

The following section describes the restrictions applied to data edition by copyright management program Pc.

The primary users 13 who desire to edit original data M0 after primary usage, inform key control center 12 of the execution of original data M0 editing via network 14, and makes a request to key control center 12 for distributing secondary use permit key K2 for original data M0 edition.

Key control center 12 that has received a request for distributing secondary use permit key K2 distributes the key K2 to primary users 13 via network system 14. By this, the primary users 13 terminal are changed to edit mode, and original data M0 becomes available for editing by primary users 13.

After decrypting encrypted original data Cm0ks1 using first secret-key Ks1, primary users 13 display and edit data. In this case, original data M0 is copied at the beginning to protect it, and then, edit is performed to editorial data M0' obtained by this copying.

When this editorial data M0' or data M0" on the way of editing is stored in the storage device inside the primary users 13 terminals, they are encrypted by the second secret-key Ks2 included in secondary use permit key K2 for storage:

$$Cm0'ks2=(Ks2, M0'), \text{ or}$$

$$Cm0''ks2=(Ks2, M0'').$$

Encrypted original data M0 is stored in the storage device without being edited. Therefore, it is possible to judge whether the file is edited or not by examining the look-up table, the file size and date of creation of data M0" on the way of editing or edited data M1.

A plurality of primary edited data M11, M12, M13 . . . are produced by data edit. The secondary copyright of primary users 13 as secondary exploitation right arises in these primary edited data M11, M12, M13 . . . . These primary edited data m11, M12, M13 are unencrypted when they are in the volatile memory in the primary users' terminals. However, when they are stored in a storage, they are encrypted using second secret-key Ks2:

$$Cm11ks2=E(Ks2, M11)$$

$$Cm12ks2=E(Ks2, M12)$$

$$Cm12ks2=E(Ks2, M13).$$

For the purposes of practice secondary copyright with reference to these primarily edited data M11, M12, M13 . . . , primary users 13 makes a request to key control center 12 via network 14 for distributing third secret-key Ks3. In response to the request, key control center 12 distributes third secret-key Ks3 to primary users 13.

Primary users 13 who have received third secret-keys Ks3 encrypt plaintext or decrypted primarily edited data M11, M12, M13 . . . using third secret-key Ks3:

$$Cm11ks3=E(Ks3, M11)$$

$$Cm12ks3=E(Ks3, M12)$$

$$Cm13ks3=E(Ks3, M13)$$

and encrypted primarily edited data Cm11ks3, Cm12ks3 and Cm13ks3 . . . are stored in the storage inside primary users terminals.

When using these encrypted data Cm11ks3, Cm12ks3 and Cm13ks3. . . decrypting and encrypting are carried out by third secret-key Ks3.

In primarily edited data M11, M12, M3 . . . edited by primary users 13, the secondary copyright of primary users 13 is present in addition to the primary copyright of the original data M0 on information providers before being edited. For the purpose of practice this secondary copyright, primary users 13 send the title of data, name of application program, outlined content and the name of primary copyright owner together with third secret-key Ks3 to key control center 12, which are to be stored and managed to key control center 12.

On the other hand, primary users 13 provide encrypted primarily edited data Cm11ks3, Cm12ks3 and Cm13ks3 . . . for secondary users 19 through copying these data into external recording medium 18 or by transferring them via network 14.

The secondary users 19 who require to use provided encrypted primarily edited data Cm11ks3, Cm12ks3 and Cm13ks3 . . . makes a request to key control center 12 or distributing third use permit key K3 including third secret-key Ks3. The usage of primarily edited data M11, M12 and M13 . . . by this use permit key K3 is limited to general use such as display and print and the storing into the storage inside the users terminals. It is not allowed to copy primarily edited data M11, M12 and M13 . . . or encrypted primarily edited data Cm11ks3, Cm12ks3 and Cm13ks3 . . . into external recording medium 18, to transfer these to tertiary users via network 14 and to repeat editing primarily edited data M11, M12 and M13 . . . .

As described above, the objective of the copyrighted data in this invention is the "object" where the programs and data are integrated. The object can be processed as parts-like through computer programming or various types of processing.

Producing new editorial data using plural original data that are the objects, will be described referring to FIGS. 4 and 3.

Figure 4:
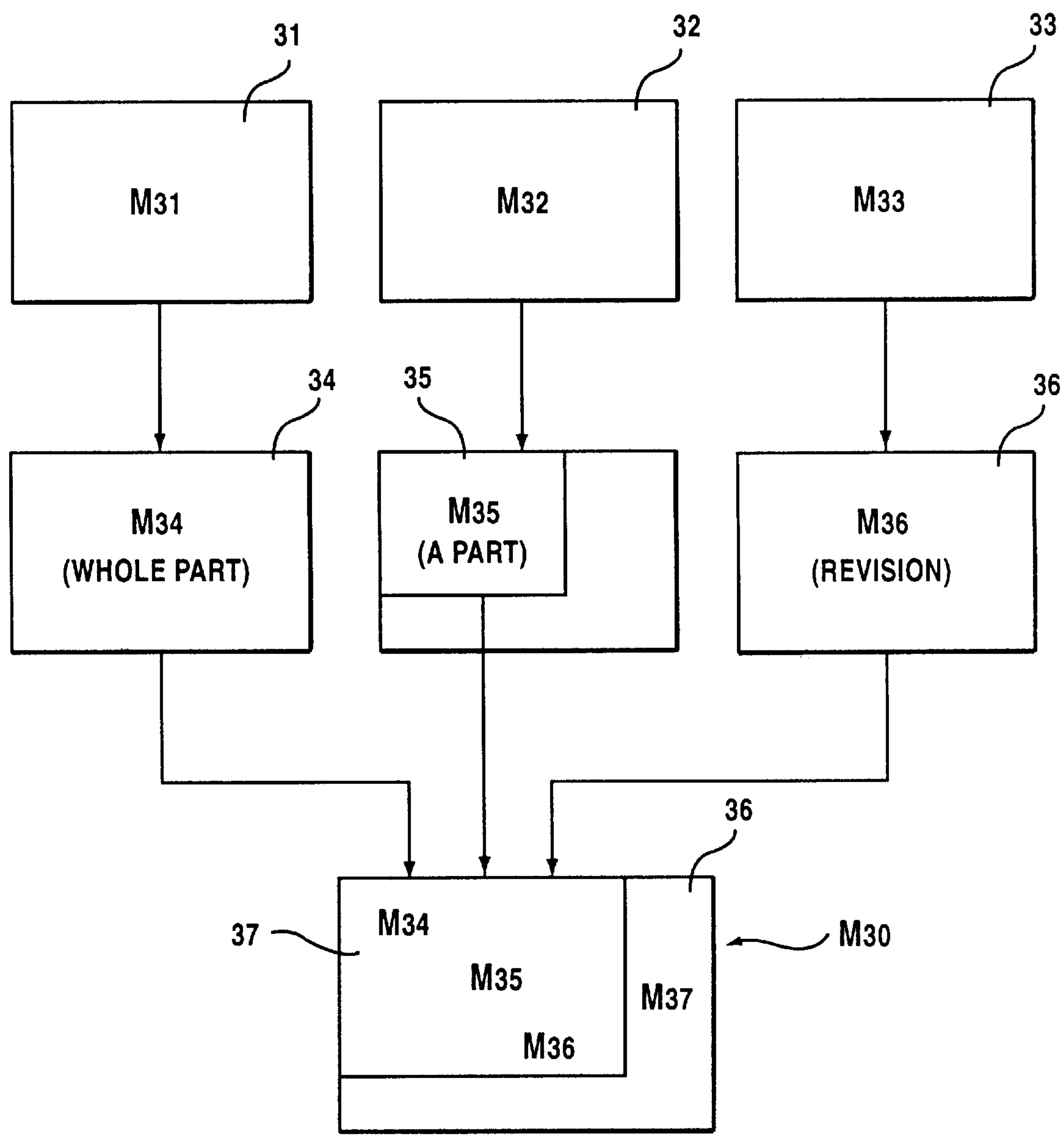
FIG. 4 illustrates an example of producing new copyrighted data using a plurality of copyrighted data as objects.

The reference numerals 31, 32 and 33 in FIG. 4 are the original data M31, M32 and M33 that comprise each object for which copyright is claimed. Primarily edited data M30, 30 is produced using these original data M31, M32 and M33.

The number of editorial forms applicable to original data M31, M32 and M33 are three. The first is the primary editorial data M34 shown in 34 where the whole portion is used. The second is the primary editorial form M35 shown in 35 where a part is used. The third is the primary editorial data M36 shown in 36 where the data is used after revision.

Original data is edited by linking copyrighted data by object-unit, referring, embedding and combining it. It is possible to embed and combine copyrighted data freely. It is also possible to add other matters on the primarily edited data M37, 37 that have been thus combined and embedded in this way. The primarily edited data M30, 30 newly produced in this way consists of object assembly.

As described above, in the primarily edited data M30 produced in this way, the secondary copyright of primary users 13 in the edition newly arises in addition to the copyright of original data M31, M32 and M33.

For practice this secondary copyright of primary users 13, it is necessary to encrypt primary editorial data. For this purpose, primary users 13 prepare third secret-keys Ks34, Ks35 and Ks36 corresponding to each of primary editorial data M34, M35 and M36, encrypt plaintext primary editorial data M34, M35 and M36 using third secret-keys Ks34, Ks35 and Ks36:

$$Cm34ks34=E(Ks34, M34)$$

$$Cm35ks35=E(Ks35, M5)$$

$$Cm36ks36=E(Ks36, M36),$$

and provide them for secondary users 19 by copying into external recording medium 18 or by transferring via network 14.

In addition, primary users 13 register third secret-keys Ks34, Ks35 and Ks36 to key control center 12. By registering these third secret-keys, the secondary copyright of primary users 13 is registered into key control center 12.

Those sent from primary users 13 to key control center 12 at this time are a plurality of third secret-keys Ks34, Ks35 and Ks36 of which number corresponds to the number of produced plural primary editorial data, and also the number of third secret-keys, second secret-keys Ks24, Ks25 and Ks26, original data name, information concerning other linking original data, access path to original data used, application programs used for original data M11, M12 and M13 and outlined explanation of copyright works.

Key control center 12 that has received a plurality of third secret-keys Ks34, Ks35 and Ks36 prepares copyright labels Lc34, Lc35 and Lc36 corresponding to a plurality of primary editorial data using original data name, information concerning other linking original data, access path to original data used, application programs used for original data M11, M12 and M13 and outlined explanation of copyright works.

At this time, the linkage between newly produced primary editorial data M34, M35 and M36 and original data M11, M12 and M13 is released. At the time the linkage is released, the entity of the original data that has had so far only relationship as the linkage with primary editorial data M34, M35 and M36 is thus embedded into newly produced primary editorial data M34, M35 and M36. By this, it becomes possible to practice the secondary copyright of encrypted primary editorial data Cm34ks34, Cm35ks35 and Cm36ks36 provided for secondary users 19.

The secondary users 19 who require to use provided encrypted primary editorial data, for example, M34 makes a request to key control center 12 for distributing third secret-key Ks34. Key control center 12 that has received the request for distributing third secret-key Ks34 distributes the third secret-key Ks34 to secondary users 19 through network 14.

The secondary users 19 who have received third secret-keys Ks3 decrypt encrypted primary editorial data Cm34ks34:

$$M34=E(Ks34, Cm34ks34)$$

and use it.

Original data copyright owner or primary editorial data owner can change the access path by applying to key control center 12. Original data copyright owner or primary editorial data owner can also edit (revise) data using other keys as well as to use third secret-keys.

It is understood that particular embodiments described herein should not limit the present invention thereby. This invention can be practiced in connection with any data management system.

Thus, a database copyright control system has been described, which is applicable to multimedia system.

What is claimed is:

1. A data copyright management method used for producing new data by editing original data wherein, a broadcast station supplies a plurality of original data encrypted using a first secret-key, to a primary user;

said primary user makes a request of use for said plurality of original data to a copyright management center;

said copyright management center sends said first secret-key and a second secret-key of each of said original data to said primary user;

said primary user decrypts said plurality of original data encrypted, by using said first secret-key;

said primary user produces new data which is produced from a plurality of edited data by editing said plurality of original data using an edit program;

said primary user encrypts said plurality of edited data respectively by said second secret-key of each said original data, and performs a digital signature on editing process data of said edit program, and supplies both said plurality of edited data and said editing process data with said digital signature to a secondary user;

said secondary user requests use of said new data by presenting said editing process data with said digital signature to said copyright management center;

said copyright management center confirms an editor as said primary user from said digital signature, and provides said secondary user with said second secret-key of each said original data; and said secondary user decrypts said plurality of edited data which have been encrypted, respectively by using said second secret-key of each said original data, and obtains said new data from said plurality of edited data by using said edit program and said editing process data.

2. The data copyright management method according to claim 1, wherein said primary user presents a public-key of said primary user to said copyright management center when requesting use of said plurality of original data.

3. The data copyright management method according to claim 1, wherein said secondary user presents a public-key of said secondary user to said copyright management center when requesting use of said plurality of original data.

4. The data copyright management method according to claim 1, wherein secondary copyright of said primary user is registered when said secondary user presents said editing process data with said digital signature to said copyright management center.

5. The data copyright management method according to claim 1, wherein said secondary user presents said plurality of edited data together with said editing process data with said digital signature to said copyright management center when requesting use of said new data.

6. The data copyright management method according to claim 1, wherein said edited data comprises a whole of one or more of said plurality of original data.

7. The data copyright management method according to claim 1, wherein said edited data comprises a part of one or more of said plurality of original data.

8. The data copyright management method according to claim 1, wherein said first secret-key is changed to said second secret-key to be used, and said second secret-key is changed to a third secret-key to be used so that said secondary user edits again said new data.

9. A data copyright management method used for producing new data by editing original data wherein, a plurality of original data encrypted using a first secret-key, are supplied from a recording medium to a primary user;

said primary user makes a request of use for said plurality of original data to a copyright management center;

said copyright management center sends said first secret-key and a second secret-key of each of said original data to said primary user;

said primary user decrypts said plurality of original data encrypted, by using said first secret-key;

said primary user produces new data which is produced from a plurality of edited data by editing said plurality of original data using an edit program;

said primary user encrypts said plurality of edited data respectively by said second secret-key of each said original data, and performs a digital signature on editing process data of said edit program, and supplies both said plurality of edited data and said editing process data with said digital signature to a secondary user;

said secondary user requests use of said new data by presenting said editing process data with said digital signature to said copyright management center;

said copyright management center confirms an editor as said primary user from said digital signature, and provides said secondary user with said second secret-key of each said original data; and said secondary user decrypts said plurality of edited data which have been encrypted, respectively by using said second secret-key of each said original data, and obtains said new data from said plurality of edited data by using said edit program and said editing process data.

10. The data copyright management method according to claim 9, wherein said primary user presents a public-key of said primary user to said copyright management center when requesting use of said plurality of original data.

11. The data copyright management method according to claim 9, wherein said secondary user presents a public-key of said secondary user to said copyright management center when requesting use of said plurality of original data.

12. The data copyright management method according to claim 9, wherein secondary copyright of said primary user is registered when said secondary user presents said editing process data with said digital signature to said copyright management center.

13. The data copyright management method according to claim 9, wherein said secondary user presents said plurality of edited data together with said editing process data with said digital signature to said copyright management center when requesting use of said new data.

14. The data copyright management method according to claim 9, wherein said edited data comprises a whole of one or more of said plurality of original data.

15. The data copyright management method according to claim 9, wherein said edited data comprises a part of one or more of said plurality of original data.

16. The data copyright management method according to claim 9, wherein said first secret-key is changed to said second secret-key to be used, and said second secret-key is changed to a third secret-key to be used so that said secondary user edits again said new data.

17. A data copyright management method used for producing new data by editing original data wherein, a plurality of original data encrypted using a first secret-key, are supplied from a database to a primary user;

said primary user makes a request of use for said plurality of original data to a copyright management center by presenting a public-key of said primary user;

said copyright management center sends said first secret-key and a second secret-key of each said original data to said primary user;

said primary user decrypts said plurality of original data encrypted, by using said first secret-key;

said primary user produces new data which is produced from a plurality of edited data by editing said plurality of original data using an edit program;

said primary user encrypts said plurality of edited data respectively by said second secret-key of each said original data, and performs a digital signature on editing process data of said edit program, and supplies both said plurality of edited data and said editing process data with said digital signature to a secondary user;

said secondary user presents a public-key of said secondary user and requests use of said new data by presenting said editing process data with said digital signature to said copyright management center;

said copyright management center confirms an editor as said primary user from said digital signature, and provides said secondary user with said second secret-key of each said original data; and said secondary user decrypts said plurality of edited data which have been encrypted, respectively by using said second secret-key of each said original data, and obtains said new data from said plurality of edited data by using said edit program and said editing process data.

18. The data copyright management method according to claim 17, wherein secondary copyright of said primary user is registered when said secondary user presents said editing process data with said digital signature to said copyright management center.

19. The data copyright management method according to claim 17, wherein said secondary user presents said plurality of edited data together with said editing process data with said digital signature to said copyright management center when requesting use of said new data.

20. The data copyright management method according to claim 17, wherein said edited data comprises a whole of one or more of said plurality of original data.

21. The data copyright management method according to claim 17, wherein said edited data comprises a part of one or more of said plurality of original data.

22. The data copyright management method according to claim 17, wherein said first secret-key is changed to said second secret-key to be used, and said second secret-key is changed to a third secret-key to be used so that said secondary user edits again said new data.

* * * * *

UNITED STATES PATENT AND TRADEMARK OFFICE

CERTIFICATE OF CORRECTION

PATENT NO.: 6,097,818
DATED : August 1, 2000
INVENTOR(S): Makoto SAITO

It is certified that an error appears in the above-identified patent and that said Letters Patent is hereby corrected as shown below:

On the title page of the patent insert item "[30] Foreign Application Priority Data October 27, 1994 [JP] Japan .............. 6-264201"

Signed and Sealed this

Seventeenth Day of April, 2001

Attest:

Nicholas P. Godici

NICHOLAS P. GODICI

Attesting Officer

*Acting Director of the United States Patent and Trademark Office*